United States Patent [19]

Bäbler

[11] Patent Number: 5,820,666
[45] Date of Patent: Oct. 13, 1998

[54] ORGANIC STIR-IN PIGMENTS

[75] Inventor: Fridolin Bäbler, Hockessin, Del.

[73] Assignee: Ciba Specialty Chemicals Corporation, Tarrytown, N.Y.

[21] Appl. No.: 783,835

[22] Filed: Jan. 13, 1997

Related U.S. Application Data

[62] Division of Ser. No. 475,164, Jun. 7, 1995, Pat. No. 5,648,408.

[51] Int. Cl.$^6$ .................................................. C04B 67/50
[52] U.S. Cl. .......................... 106/412; 106/410; 106/413
[58] Field of Search .................... 106/410, 412, 106/413

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 4,168,180 | 9/1979 | Peabody | 106/308 M |
| 4,221,606 | 9/1980 | Funatsu et al. | 106/288 Q |
| 4,370,270 | 1/1983 | Bock et al. | 260/244.87 |
| 4,517,320 | 5/1985 | Bäbler et al. | 523/215 |
| 4,801,702 | 1/1989 | Bäbler | 540/144 |
| 5,074,918 | 12/1991 | Bäbler | 106/493 |
| 5,084,573 | 1/1992 | Bäbler et al. | 546/56 |
| 5,095,122 | 3/1992 | Bugnan et al. | 548/453 |
| 5,298,076 | 3/1994 | Bäbler | 106/498 |
| 5,347,014 | 9/1994 | Bäbler | 548/453 |

FOREIGN PATENT DOCUMENTS

| | | |
|---|---|---|
| 0220617 | 5/1987 | European Pat. Off. . |
| 0278633 | 8/1988 | European Pat. Off. . |
| 0362129 | 4/1990 | European Pat. Off. . |
| 0367236 | 5/1990 | European Pat. Off. . |
| 0416395 | 3/1991 | European Pat. Off. . |
| 0554776 | 3/1993 | European Pat. Off. . |
| 4037735 | 6/1992 | Germany . |
| 4211560 | 10/1993 | Germany . |
| 4225031 | 2/1994 | Germany . |
| 9311194 | 6/1993 | WIPO . |

OTHER PUBLICATIONS

Derwent Abstract, 84–220105/36 of (DE 306,400–Aug. 30, 1984).

*Primary Examiner*—Edward J. Cain
*Attorney, Agent, or Firm*—Kevin T. Mansfield

[57] ABSTRACT

The disclosure relates to the use of conditioned organic pigments as stir-in pigments in various applications. The conditioned pigments are prepared by wet-milling a pigment crude to a particle size of 0.1 to 9 μm and a specific surface area in the range of from 6 to 35 m$^2$/g.

9 Claims, No Drawings

ORGANIC STIR-IN PIGMENTS

This is a divisional of application Ser. No. 08/475,164, filed Jun. 7, 1995 now U.S. Pat. No. 5,648,408.

SUMMARY

This application relates to a method of coloring high-molecular-weight organic materials with organic stir-in pigments.

BACKGROUND

In general, after being mixed into an aqueous or solvent-borne resin system, an organic pigment must be further dispersed prior to its final application in order to ensure that the organic pigment is homogeneously dispersed in the resin system. This additional dispersion step generally requires that the pigment be dispersed for a period of 2 to 48 hours using milling equipment, such as a vertical or horizontal bead mill or an attritor mill with milling media, such as glass beads or stainless steel balls. Since this additional dispersion step is both time-consuming and costly, the elimination of this step by using pigments that are adequately dispersed during a simple mixing step, without the need for the additional dispersing step, is a great advantage.

Pigments which are substantially homogeneously dispersed in the high-molecular-weight organic material without the above-described additional dispersion step are referred to as "stir-in pigments" in this application.

It is generally known that "effect" pigments, which often are relatively large particle size, platelet-shaped particles, are usually incorporated in coatings systems without an additional dispersion step. The additional dispersion step is avoided in order to prevent the breaking of the large platelet-shaped particles.

In this application, the expression "effect pigment" means inorganic or organic pigments which show metallic, pearlescent and/or silky-luster effects. Such effect pigments are generally inorganic pigments such as metallics, like aluminum, $TiO_2$-coated mica pigments, platelet graphite and platelet molybdenum disulfide. Other effect pigments are prepared by coating a flaky crystalline form of a substrate with a small amount of a dyestuff or inorganic pigment, for example, a metal oxide coated mica. In addition, the effect pigments include certain platelet-shaped organic pigments, such as platelet copper phthalocyanine and those described in U.S. Pat. No. 5,084,573, U.S. Pat. No. 5,095,122, and allowed U.S. patent application Ser. No.08/013,444. In each instance, such pigments are readily distinguished from conditioned organic pigments; especially by their particle size and specific surface area.

U.S. Pat. No. 5,298,076 discloses the use of an unconditioned carbazole dioxazine crude as a multi-colored effect pigment for use in a variety of applications, including as a stir-in pigment. This publication does not suggest that a conditioned carbazole dioxazine pigment could be utilized as stir-in pigment.

A number of conditioning processes are known for the conditioning of organic pigments by diminution of the corresponding crude organic pigment. For example, milling and kneading in the presence of salt, or wet milling processes in the presence of appropriate additives, are well-known conditioning processes for organic pigments. However, it has not been disclosed that such conditioned organic pigments can be used as stir-in pigments.

This invention relates to the surprising discovery that a pigment which has excellent stir-in pigment properties is prepared by wet-milling a pigment crude consisting of primary pigment particles with an average particle size of from 3 to 35 $\mu$m to yield an organic stir-in pigment with an average particle size of 0.1 to 9 $\mu$m. Since the organic stir-in pigments of this invention are simply added and stirred into a suspension or solution of the high-molecular-weight organic material, the inventive stir-in pigments avoid the costly energy and time consuming dispersion process that is normally required to uniformly disperse pigments in a coating or ink system.

DETAILED DESCRIPTION

This invention relates to a method of coloring a high-molecular-weight organic material, which comprises uniformly dispersing an effective pigmenting amount of a stir-in pigment in the high-molecular-weight organic material by stirring the stir-in pigment into a suspension or solution of the high-molecular-weight material; wherein the stir-in pigment is a conditioned organic pigment with an average particle size of 0.1 to 9 $\mu$m and a specific surface area in the range of from 6 to 35 $m^2/g$. Preferably, the stir-in pigment has a broad particle size distribution. The stir-in pigments used in the present process are easily dispersible, show high opacity, high color strength, as well as excellent viscosity and gloss properties.

In this application, the term "stirring" is intended to have its usual meaning, but is also intended to include any low-sheer-force mixing step, such as shaking.

In general, the stir-in pigments of the present invention are uniformly dispersed simply by mixing the stir-in pigment into a solution or suspension of the high-molecular-weight organic material. The mixing simply involves blending the stir-in pigment into a solution, suspension or powder of the high-molecular-weight organic material until a uniform dispersion is achieved. The mixing is advantageously carried out by stirring the resulting pigmented suspension for from about 5 minutes to about 3 hours, preferably for from 10 to 30 minutes, by stirring methods known in the art, for example with a disk or propeller stirrer. No other dispersion step is necessary to achieve a uniform dispersion of the pigment in the high-molecular-weight organic material.

The stir-in pigments are generally incorporated into a suspension or solution of the high-molecular-weight organic material for most applications, for example, the preparation of coating compositions or inks. However, the stir-in pigments are also blended with certain plastics as powders. Generally, the blended powders are subsequently calendared, cast, molded or processed to fibers.

Since this invention is based on the discovery that the particle size of the pigment is critical to its utility as a stir-in pigment, the present method is a general method applicable with any conditioned organic pigment, preferably those that are wet-milled to the proper particle size.

Especially suitable classes of pigments and pigment crudes include the azo, azomethine, methine, anthraquinone, phthalocyanine, perinone, perylene, diketopyrrolopyrrole, thioindigo, iminoisoindoline, iminoisoindolinone, dioxazine, quinacridone, flavanthrone, indanthrone, anthrapyrimidine and quinophthalone pigments; in particular the diketopyrrolopyrrole, quinacridone, phthalocyanine, anthraquinone, dioxazine, indanthrone or iminoisoindolinone pigments.

Notable pigments useful in the present process are those pigments identified in The Colour Index, including the quinacridone pigments, C.I. Pigment Red 202 and C.I.

Pigment Violet 19; the isoindolinone pigment, C.I. Pigment Yellow 110; the diketopyrrolopyrrole pigments, C.I. Pigment Red 254, C.I. Pigment Red 264, C.I. Pigment Red 255 and C.I. Pigment Orange 73; the anthraquinone pigments, C.I. Pigment Blue 60 and C.I. Pigment Yellow 147; the dioxazine pigment, C.I. Pigment Violet 23 and the phthalocyanine pigment, C.I. Pigment Blue 15.

In particular, the stir-in pigment is an alpha or beta copper phthalocyanine, which is optionally stabilized with a chloro-substituted copper phthalocyanine derivative.

The inventive stir-in pigments are characterized by their particle size, particle size distribution and specific surface area. Preferably, the stir-in pigment has an average particle size of 0.2 to 7 $\mu$m and a specific surface area in the range of from 6 to 30 m$^2$/g, most preferably from 0.5 to 5 $\mu$m and from 8 to 28 m$^2$/g.

The conditioned organic pigment of proper particle size and surface area is preferably prepared by wet-milling a corresponding pigment crude with an average particle size above 3 $\mu$m, in particular from 3 to 35 $\mu$m. The expression "pigment crude" means the form obtained from the last synthetic step. Particularly suitable pigment crudes are, for example, beta copper phthalocyanine pigment crude, or alpha copper phthalocyanine crude, which are optionally stabilized by chlorophthalocyanine derivatives.

In the inventive process, the pigment crude is wet-milled preferably by an aqueous milling process. The grinding apparatus may be any suitable device which makes it possible for the pigment crude to be subjected to mechanical forces. For example, a suitable milling process includes one wherein a grinding element, such as metal, glass or porcelain balls, plastic granules or sand grains, is set in motion by rotation, or vibration. Devices such as horizontal or vertical bead mills are also suitable as apparatus for the milling process. Horizontal bead mills which allow a continuous flow of an aqueous pigment suspension through the mill are preferred grinding equipment. Preferably, the pigment crude is milled as an aqueous suspension in a horizontal bead mill.

In order to further improve the stir-in pigment properties of the pigments obtained by the present process texture-improving agents, anti-flocculating agents or extenders are optionally added before, during or after the wet-milling process.

The texture-improving agent, anti-flocculant and/or extender is preferably incorporated into the present stir-in pigment in an amount of from 0.05 to 30 percent, most preferably 5 to 25 percent, by weight, based on the combined weights of the organic pigment, texture-improving agent and/or extender.

Texture-improving agents are especially useful as an additional component which improves the properties of the stir-in pigment composition. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines like lauryl amine, or stearylamine. In addition, fatty alcohols or ethoxylated fatty alcohols, polyols, like aliphatic 1,2-diols or polyvinylalcohol and epoxidized soya bean oil, waxes, resin acids and resin acid salts are suitable texture-improving agents. Rosin acids and rosin acid salts are especially suitable texture-improving agents.

Anti-flocculating agents are known in the pigments industry and are described, for example, in U.S. Pat. Nos. 3,386,843, 4,310,359 and 4,692,189, which are incorporated by reference.

Extenders which are suitable in the inventive process are, for example, inorganic extenders like talc, mica, kaolin and natural or synthetic silicas, preferably talc or mica, or organic polymeric extenders like, for example, small particle size polyamide, polyethylene or polypropylene waxes, their mixtures or copolymers thereof. It is known in the art that such kinds of extenders can act as grinding agents. Depending on the pigment and the extender, they can also improve the dispersibility of the inventive stir-in pigment. Preferably the extenders have an average particle size of below 15 $\mu$m, most preferably between 2 to 10 $\mu$m.

In a preferred method, the pigment crude is dispersed in an aqueous solution of the sodium salt of a rosin, optionally in the presence of an extender. Preferably the resulting pigment suspension contains 5 to 25% pigment, by weight. The pigment suspension is then pumped into a horizontal bead mill and milled until the particle size of the pigment is in the required range. The milled suspension is stirred and the rosin salt is precipitated by adding of a salt of a divalent or trivalent metal to the suspension.

Thus, the inventive process includes a process wherein the stir-in pigment is prepared by a process, which comprises (a) preparing an aqueous suspension comprising the organic pigment crude, a soluble alkaline salt of a rosin and an extender; (b) milling the aqueous suspension in a horizontal bead mill by pumping it continuously through the mill until the particle size of the pigment is within the required range; (c) adding a divalent or trivalent metal salt to the milled pigment suspension; and (d) isolating the stir-in pigment. The pigment is generally isolated by filtration, washing and drying, preferably for example by a fluidized bed, spray-drying or tray-drying method, optionally followed by micropulverization.

The inventive process is not limited to the order of steps set forth above. For example it can be advantageous to precipitate the rosin acid salt prior to the milling step or to adjust the pH to neutral or to the acid or alkaline range.

The milling temperature is preferably in the temperature range from 5° to 90° C., preferably from 15° to 60° C.

The milling process is normally carried out in the absence of organic solvents. Minor amounts may, however, be tolerated if they do not impair the process. Additionally, it may be advantageous to add a small amount of an organic solvent, in particular, a water-soluble or partially water-soluble solvent, such as a $C_1$–$C_5$ alcohol or ethyl acetate, to the milled pigment suspension and then subject it to a heat treatment prior to filtration in order to generate a pigment of the desired particle size.

Depending on the apparatus employed, batch, speed of rotation, pigment and assistants, the grinding time is from 10 minutes to 72 hours. The requisite grinding time can be readily ascertained by measuring the pigment particle size.

Preferably the stir-in pigment contains pigment particles with a wide particle size distribution, wherein the extremes of the particles preferably are by a factor of 3 to 20 times, preferably 4 to 15 times, most preferably by a factor 5 to 10 times smaller or larger than the corresponding mean particle size. The presence of small particles enhance the color strength whereas the presence of the larger particles provide increased flop, opacity and better viscosity behavior. Thus the inventive process comprises a method wherein the organic stir-in pigment has a broad particle size distribution wherein the extremes of the particles are larger or smaller than the mean particle size by a factor of from 3 to 20.

While dry milling processes normally yield pigment particles with extremely small particle sizes, the present wet milling process easily carries out the diminution of the large particle size pigment crude to the desired pigment particle size.

Generally, an effective pigmenting amount of the stir-in pigment is incorporated into the high-molecular-weight organic material to be pigmented. An effective pigmenting amount is any amount suitable to provide the desired color in the high-molecular-weight organic material. In particular, the stir-in pigments are used in an amount of 0.01 to 30% by weight, preferably 0.1 to 10% by weight, based on the weight of the high-molecular-weight organic material to be pigmented.

The pigmented, high-molecular-weight organic materials which are colored according to the present process are useful in a variety of applications. For example, the high-molecular-weight organic material can be used for the pigmentation of lacquers, inks and enamel coating compositions. The pigmented high-molecular-weight organic materials prepared according to the present invention are particularly useful for preparing automotive coating paints.

The high-molecular-weight organic materials which are colored according to the present process are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High-molecular-weight organic materials which are useful for heat-curable coatings or cross-linking, chemically-reactive coatings, are also colored according to the present process. The pigmented, high-molecular-weight organic materials prepared according to the present process are especially useful in stoving finishes which contain the customary binders and which are reactive at high temperature. Examples of the pigmented, high-molecular-weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high-molecular-weight organic materials prepared according to the present process are also useful as air-drying or physically-drying coatings, for example, conventional lacquers such as those used in the cosmetics industry as nail varnishes, for example nitrocellulose lacquers.

The present process is particularly suitable for preparing coatings conventionally employed in the automobile industry, especially in acrylic/melamine resin, alkyd/melamine resin or thermoplastic acrylic resin systems, as well as in aqueous based coating systems. Thus, the present invention includes processes wherein the high-molecular-weight organic material is an aqueous or solvent based automotive paint system.

Coatings and ink systems colored by the present process possess excellent heat, light and weatherfastness, as well as bleed and overspraying fastness properties.

Due to the excellent dispersibility behavior of the stir-in pigments of this invention, uniform distribution of pigment particles throughout the entire application media is achieved. Compositions containing the present stir-in pigments show excellent rheological behavior.

The conditioned pigments utilized in the present process have excellent stir-in pigment properties and can be applied alone or in the presence of other pigments or dyes in basecoat/clearcoat, as well as monocoat automotive or industrial paint and ink systems. The paints show an attractive appearance. For example, unique styling effects can be achieved when the present pigments are incorporated in conjunction with effect pigments, such as, graphite, aluminum or particularly $TiO_2$ or Fe oxide coated mica pigments.

The present stir-in pigments are particularly suitable for coloring high-molecular-weight organic materials which are plastics that are calendared, cast, molded or processed to fibers, and the like. Such pigmented plastics show practically no abrasion during processing. The pigment compositions impart excellent physical properties to colored plastic articles like polypropylene or polyamide fibers, plastic films, bottle crates and so on. Thus, the present invention further embraces processes wherein the high-molecular-weight organic compound is a plastic that is subsequently calendared, cast, molded or processed to fibers.

The following examples further describe the embodiments of the invention, but do not limit the scope of the invention. In the examples, all parts are by weight unless otherwise indicated.

Particle size distribution is determined in accordance with the principle of Fraunhofer light diffraction. A laser beam passes through the sample and the resulting diffraction pattern is focused on a multielement detector. Since the diffraction pattern depends, among other parameters, on particle size, particle size distribution can be calculated on the basis of the measured diffraction pattern of the sample. The cumulative volume distribution is determined using a Fraunhofer diffraction instrument, e.g. a COMPETITION/5-HELOS/KA, from SYMPATEC GmbH, D-38644 Goslar, in accordance with the instruction manual.

EXAMPLE 1

150 grams of a beta copper phthalocyanine pigment crude having a specific surface area of 4.7 $m^2$/g, 750 ml water and 4.5 grams of a sodium salt of a rosin (DRESINATE X from HERCULES Corp.) dissolved in 50 ml water are added together to a 2 liter glass beaker and stirred at room temperature for 15 minutes. The pigment suspension is ground in a horizontal bead mill having a 600 ml steel milling chamber filled with 480–510 ml glass beads of around 1 mm diameter, at a stirring speed of 3000 rpm. The plastic disc stirrer has a tip speed of 10.2 m/sec. The blue pigment crude suspension is milled twice, whereby the suspension is pumped each time at a speed of 127 ml/minute through the mill at a temperature of from 20°–28° C. The resultant pigment suspension is stirred at ambient temperature for 10 minutes after which 1.5 grams of calcium chloride dissolved in 30 ml water are added to the pigment suspension and the pH is adjusted to 5.5–5.8. The resulting pigment suspension is then filtered, and the filter cake is washed with water and dried at 80°–100° C. The dried pigment is micropulverized in an assemble micropulverizer (The BANTAM, type G90 from American Marietta Company) using a 0.039 inch round hole screen and a rotating speed of 7000 RPM.

The pigment obtained has a specific surface area of 8.5 $m^2$/g determined by the BET method. The particle size distribution shows 30% of the pigment particles from 0.3 to 1.5 µm, 40% from 1.5 to 3.6 µm and 30% from 3.6 to 10.2 µm; with an average particle size of 2.4 µm. The pigment is suitable as a stir-in pigment when incorporated in paint systems. The resulting coating has outstanding weatherability.

EXAMPLE 2

120 grams of beta copper phthalocyanine pigment crude having a specific surface area of 4.7 $m^2$/g, 30 grams of talc powder having an average particle size of around 3 μm, 1000 ml water and 4.5 grams of a sodium salt of a rosin (DRESINATE X from HERCULES Corp.), which is dissolved in 50 ml of water, are added to a glass beaker and stirred at room temperature for 20 minutes. The pigment suspension is ground in a bead mill, having a 600 ml steel milling chamber filled with 480–510 ml glass beads of around 1 mm diameter, at a stirring speed of 3000 rpm. The plastic disc stirrer has a tip speed of 10.2 m/sec. The blue pigment suspension is milled in four times, whereby the suspension is pumped through the mill at a speed of 125–130 ml/minute at 20°–28° C. each time. The resultant pigment suspension is stirred at ambient temperature for 10 minutes after which 1.5 grams of calcium chloride dissolved in 30 ml water are added to generate the Ca salt of the rosin. The pH is then adjusted to 5.5 to 5.8. The suspension is stirred for 20 minutes at a pH of 5.5 to 5.8 and then filtered. The filter cake is washed with water, dried at 80°–100° C. and micropulverized in an assemble micropulverizer using a 0.039 inch round hole screen and a rotating speed of 7000 RPM.

The pigment has a specific surface area of 11.5 m$^2$/g determined by the BET method. The particle size distribution shows 30% of the pigment particles from 0.2 to 1.3 μm, 40% from 1.3 to 3.0 μm and 30% from 3.0 to 9.4 μm; with an average particle size of 2.0 μm. The pigment is highly suitable as organic stir-in pigment when applied in automotive paints.

EXAMPLE 3

The procedure described in Example 2 is repeated, however, the pigment suspension is milled for 65 minutes, whereby the pigment suspension is circulated from the beaker through the mill and back into the same beaker at a speed of 160 to 165 ml/minute. The conditioned pigment so obtained has a specific surface area of 14.8 m$^2$/g determined by the BET method. The particle size distribution shows 30% of the pigment particles from 0.2 to 1.1 μm, 40% from 1.1 to 2.5 μm and 30% from 2.5 to 8.6 μm; with an average particle size of 1.6 μm. The pigment shows outstanding fastness properties like heat stability and weatherability and is incorporated as stir-in pigment in paint and ink systems.

EXAMPLE 4

120 grams of anthraquinone yellow pigment crude (C.I. Pigment Yellow 147), 30 grams talc powder having an average particle size of around 3 μm, 1000 ml water and 4.5 grams of a sodium salt of a rosin (DRESINATE X from HERCULES Corp.), which is dissolved in 50 ml water, are added to a glass beaker equipped with thermometer and stirrer. The resulting pigment suspension is stirred at 20° to 28° C. for 20 minutes. 1.5 grams calcium chloride dissolved in 30 ml water are added to precipitate the rosin as calcium salt. The suspension is stirred for further 15 minutes at a pH of 5.5 to 5.8. The pigment suspension is then ground in a bead mill having a 600 ml steel milling chamber filled with 480–510 ml of glass beads with a diameter of about 1 mm, at a stirring speed of 3000 rpm. The plastic disc stirrer has a tip speed of 10.2 m/sec. The pigment suspension is milled for 45 minutes, whereby the pigment suspension is circulated continuously from the beaker through the mill and back into the same beaker at a speed of 250 ml/min. and at a temperature of 20° to 28° C. The pH of the resultant pigment suspension is adjusted to 5.5 to 5.8 then filtered. The filter cake is washed with water and dried at 80°–100° C.

The pigment has a specific surface area of 17.8 m$^2$/g determined by the BET method. The electron micrograph shows the principal portion of the particles with a pigment particle size of 0.1 to 3.0 μm. The yellow pigment shows good stir-in pigment properties and yields strong yellow colorations when applied in plastics and paints.

EXAMPLE 5

The procedure of Example 4 is repeated using 120 grams of the isoindolinone pigment C.I. Pigment Yellow 110 as pigment crude to yield a pigment with a specific surface area of 21 m$^2$/g determined by the BET method. The principal portion of the particles with a pigment particle size of 0.1 to 3.0 μm as determined by electron microscopy. The stir-in pigment demonstrates excellent pigment properties when applied in paint systems.

EXAMPLE 6

The procedure of Example 2 is repeated using 120 grams of 2,9-dichloroquinacridone pigment crude with a specific surface area of 18 m$^2$/g in place of the copper phthalocyanine pigment crude to yield a magenta stir-in pigment with a specific surface area of 23.5 m$^2$/g. The principal portion of the particles with a pigment particle size of 0.1 to 2.6 μm. The pigment demonstrates excellent stir-in pigment properties and outstanding light and heat stability.

EXAMPLES 7A TO 7D

These examples illustrate the incorporation of the phthalocyanine pigment prepared in Example 1 as a stir-in pigment into an acrylic/melamine base/clearcoat system. Resin solutions are prepared as follows:

I. Solid Clear Solution

The following ingredients are stirred together to provide a "solid clear solution" containing 57.53% solids:

1171 grams of a nonaqueous dispersion resin (NAD-resin), 719.1 grams of a melamine resin, 269.4 grams of a solvent mixture of aliphatic and aromatic hydrocarbons (SOLVESSO 100 distributed by American Chemical), 597.6 grams of polyester urethane resin, 125.1 grams of a catalyst solution, and 120 grams of butanol.

II. Metallic Clear Solution

The following ingredients are stirred together to provide a "metallic clear solution" containing 59.2% solids:

1353.0 grams of a nonaqueous dispersion (NAD) resin, 786.2 grams of melamine resin, 144.6 grams of xylene, 65.6 grams of UV Screener Solution, 471.6 grams of acrylourethane resin, 89.0 grams of catalyst solution, and 90.0 grams of methanol.

III. Mica Dispersion

The following ingredients are stirred together to provide a mica dispersion containing 27.9% pearlescent mica pigment and a total solid content of 69.1% solids:

251.1 grams of bright white mica, EXTERIOR MEARLIN from The Mearl Corp., 315.0 grams of NAD-resin, and 180.0 grams of acrylourethane resin.

IV. Stir-in Pigment Dispersion

The following ingredients are stirred together in an pint can:

66.0 grams of acrylourethane resin,
14.5 grams of AB-dispersant, and
58.1 grams of SOLVESSO 100.

26.4 grams of the phthalocyanine pigment obtained according Example 1 are then added to the above resin/solvent mixture as a stir-in pigment. The blue pigment dispersion is stirred at slow to medium speed for 15 to 20 minutes, providing a homogeneous non-viscous stir-in pigment dispersion containing 16.0% blue phthalocyanine pigment, a total solid content of 48% solids in a pigment to binder ratio of 0.5.

V. TiO$_2$ Dispersion

A TiO$_2$ dispersion is prepared by mixing the following ingredients in a quart can:

604.1 grams of a TiO$_2$ pigment,
129.8 grams of acrylourethane resin, and
161.1 grams of SOLVESSO 100.

1 pint of ½ inch ceramic balls are then added. The dispersion is then milled for 24 hours. The white pigment dispersion is separated from the balls yielding a "TiO$_2$ dispersion" containing 67.5% pigment with a total solid content of 77.4% solids.

EXAMPLE 7A

Masstone Color Shade:

53.5 grams "stir-in pigment dispersion IV" and 76.5 grams "solid clear solution I" are combined with stirring. The blue resin/pigment dispersion is sprayed onto a panel twice in 1.5 minute intervals as basecoat. After 2 minutes, clearcoat resin is sprayed twice at 1.5 minute intervals onto the basecoat. The sprayed panel is then flashed with air in a flash cabinet for 30 minutes and then "baked" in an oven at 250° F. (121° C.) for 30 minutes, yielding a dark blue colored panel with excellent weatherability. A microscopic evaluation shows a homogeneous distribution of the pigment particles in the coating system.

EXAMPLE 7B

An 80/20 white mica shade is prepared by mixing the following ingredients:

| | |
|---|---|
| 46.1 grams | "stir-in pigment dispersion IV" |
| 6.6 grams | "mica dispersion III" |
| 6.9 grams | NAD resin, |
| 70.4 grams | "metallic clear solution II" |

The blue pigment/pearlescent mica/resin dispersion is sprayed onto a panel followed by a clearcoat as described in Example 1B. A blue effect color paint is obtained which shows a reddish flop and excellent weatherability. The pigment particles are homogeneously distributed in the coating system. Additionally, the paint shows a high gloss.

EXAMPLE 7C

A 50/50 white mica shade is prepared by mixing the following ingredients:

| | |
|---|---|
| 29.9 grams | "stir-in pigment dispersion IV" |
| 17.1 grams | "mica dispersion III" |
| 6.4 grams | acrylourethane resin, |
| 3.6 grams | NAD resin, |
| 73.0 grams | "metallic clear solution II". |

The blue pigment/pearlescent mica/resin dispersion is sprayed onto a panel followed by a clearcoat as described in Example 1B. A blue effect color paint is obtained which shows a strong reddish flop and excellent weatherability and gloss properties. The pigment particles are homogeneously distributed in the coating system.

EXAMPLE 7D

A 10/90 tint shade is prepared by mixing the following ingredients:

| | |
|---|---|
| 7.7 grams | "stir-in pigment dispersion IV" |
| 16.4 grams | "TiO$_2$ dispersion V", |
| 14.3 grams | acrylourethane resin, |
| 61.6 grams | "solid clear solution I" |

The blue pigment/TiO$_2$/resin dispersion is sprayed onto a panel followed by a clearcoat as described in Example 1B, yielding a high gloss blue tinted panel in which the pigment particles are homogeneously dispersed.

Similar results in different color shades are achieved if the stir-in pigment of Example 1 is replaced in any of Examples 7A–7D by the stir-in pigments of the Examples 2 to 6.

EXAMPLE 8

This example demonstrates the incorporation of the stir-in pigment into a monocoat, high-solid enamel automotive coating system directly as a stir-in pigment.

The following ingredients are added to a ½ pint can:

| | |
|---|---|
| 64.2 grams | high solids acrylic resin |
| 14.5 grams | AB-dispersant |
| 60.1 grams | xylene |

The can containing the above mixture is shaken for 10 minutes on a shaker.

26.4 grams copper phthalocyanine pigment obtained according to Example 3 are added with stirring at medium speed to the above resin/solvent mixture as a stir-in pigment. The blue pigment dispersion is stirred at medium speed for 15 minutes providing a homogenous, nonviscous "stir-in pigment dispersion", containing 16.0% phthalocyanine pigment with a total solid content of 48% solids in a pigment/binder ratio of 0.5.

| "Paint-dispersion": | |
|---|---|
| 54.6 grams | of the above "stir-in pigment dispersion" |
| 17.5 grams | high-solids acrylic resin |
| 21.6 grams | melamine resin, and |
| 31.3 grams | solid clear solution (described in Example 7) | are combined with stirring. The blue resin/pigment dispersion is thinned with Solvesso 100 to a spray viscosity of 28 seconds as determined by a #4 Ford cup and sprayed onto a panel three times in a 2 minute intervals. The sprayed panel is then flashed with air in a flash cabinet for 10 minutes then "baked" in an oven at 265° F. (130° C.) yielding a high chroma blue colored panel. The panel has an even high gloss surface with excellent weatherability and opacity.

Similar results are achieved if the stir-in pigment of Example 3 is replaced by the stir-in pigments of the Examples 1 and 2.

EXAMPLE 9

This example demonstrates the incorporation of the stir-in pigment composition of Example 1 into a PVC sheet.

63.0 grams of polyvinylchloride, 3.0 grams epoxidized soya bean oil, 2.0 grams of barium/cadmium heat stabilizer, 32.0 grams dioctyl phthalate and 1.0 gram of the stir-in pigment prepared according to Example 1 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive blue shade with excellent fastness to heat, light and migration.

EXAMPLE 10

This example demonstrates the incorporation of a stir-in pigment composition into HDPE.

A mixture of 100 grams high density polyethylene powder and 0.5 grams of the pigment obtained according to Example 5 are blended for 15 minutes in a glass bottle on a roller gear bed. Extrusion of the mixture into a ribbon with a laboratory extruder produces a ribbon colored in a uniform yellow color which possesses excellent light and heat stability. The pigment is uniformly distributed in the HDPE plastic.

Similar results in different color shades are achieved if the pigment of Example 5 is replaced by the stir-in pigments of Examples 1 to 4 and Example 6.

I claim:

1. An organic stir-in pigment which consists essentially of 70 to 99.95 percent by weight of a milled alpha or beta copper phthalocyanine having an average particle size in the range from 0.1 to 9 $\mu$m and a specific surface area in the range from 6 to 35 $m^2$/gram and from 0.05 to 30 percent by weight of one or more additives selected from the group consisting of a texture-improving agent, an anti-flocculating agent and an extender.

2. An organic stir-in pigment of claim 1 wherein the milled copper phthalocyanine has an average particle size in the range from 0.2 to 7 $\mu$m and a specific surface area in the range from 6 to 30 $m^2$/gram.

3. An organic stir-in pigment of claim 2 wherein the milled copper phthalocyanine has an average particle size in the range from 0.5 to 5 $\mu$m and a specific surface area in the range from 8 to 28 $m^2$/gram.

4. An organic stir-in pigment of claim 1 wherein the milled copper phthalocyanine is stabilized with a chloro-substituted copper phthalocyanine derivative.

5. An organic stir-in pigment of claim 1 which contains from 5 to 25 percent by weight of a texture-improving agent.

6. An organic stir-in pigment of claim 3 which contains from 5 to 25 percent by weight of an extender.

7. An organic stir-in pigment of claim 1 wherein the milled copper phthalocyanine is prepared by wet-milling a copper phthalocyanine crude having an average particle size above 3 $\mu$m.

8. An organic stir-in pigment of claim 1, wherein said extender is selected from the group consisting of talc, mica, kaolin, natural or synthetic silica, small particle size polyamide and polyethylene and polypropylene waxes, or a mixture thereof.

9. An organic stir-in pigment of claim 6, wherein said extender is selected from the group consisting of talc, mica, kaolin, natural or synthetic silica, small particle size polyamide and polyethylene and polypropylene waxes, or a mixture thereof.

* * * * *